Feb. 24, 1970  E. Y. WEISSMAN  3,497,388
HYBRID GAS-DEPOLARIZED ELECTRICAL POWER UNIT
Filed Dec. 30, 1965  2 Sheets-Sheet 1

Inventor:
Eugene Y. Weissman,
by Carl O. Thomas
His Attorney.

United States Patent Office 3,497,388
Patented Feb. 24, 1970

3,497,388
HYBRID GAS-DEPOLARIZED ELECTRICAL POWER UNIT
Eugene Y. Weissman, Marblehead, Mass., assignor to General Electric Company, a corporation of New York
Filed Dec. 30, 1965, Ser. No. 517,717
Int. Cl. H01m 3/00, 1/06, 27/02
U.S. Cl. 136—83
12 Claims

ABSTRACT OF THE DISCLOSURE

A hybrid gas-depolarized electrical power unit has a lower housing for confining an electrolyte, an opening above the electrolyte, a gas generating anode, and a gas depolarized electrode; an upper housing sealed removably to the lower housing; a gas-permeable, liquid-impermeable barrier interposed between the housings; and the upper housing including at least one electrode-electrolyte assembly.

My invention relates to a novel hybrid unit for supplying electrical power.

It is an object of my invention to provide a reliable, unitary, low cost, efficient, manually portable electrical power source.

It is a more specific object to provide a unit exhibiting a high energy output per pound.

It is another object to provide a unit that can be quickly and repeatedly reactivated without electrical charging.

These and other objects of my invention are accomplished by providing a hybrid electrical power unit comprised of a lower housing means and an upper housing means. The lower housing means serves to confine an electrolyte and includes a gas-depolarized electrode positioned for contact with the electrolyte. A gas generating anode means may be removably positioned within the lower housing means for contact with the electrolyte and spaced from the gas depolarized electrode. The upper housing means is removably sealed to the lower housing means to receive and confine gas generated at the anode means. The upper housing means includes an electrode-electrolyte assembly formed of first and second spaced electrodes having an electrolyte means interposed therebetween. The first and second electrodes lie adjacent the interior and exterior surfaces of the upper housing means respectively.

The anode means may optionally include a filter means enveloping the anodically active portion thereof contacting the electrolyte. The unit may also optionally include a gas-permeable, liquid-impermeable barrier means interposed between the electrolyte and the first electrode to prevent entrainment of electrolyte with the gas generated at the anode means and contacting the first electrode.

My invention may be better understood by reference to the following detailed description considered in conjunction with the drawings, in which FIGURE 1 is a plan view with portions broken away, partly in section, of a unit constructed according to my invention;

Figure 1:
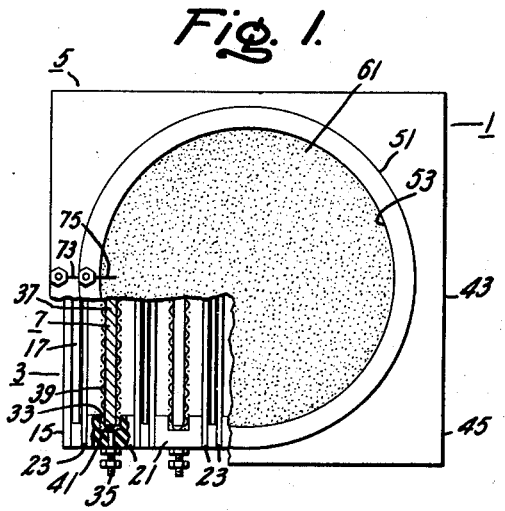
Figure 2:
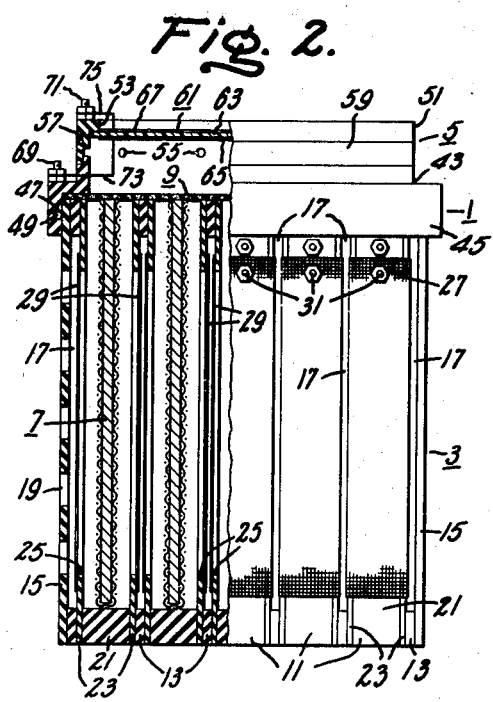
FIGURE 2 is an elevation, partly in section, of the unit shown in FIGURE 1.

FIGURES 1 and 2 illustrate a hybrid electrical power unit 1 formed of four major separable portions which are for purposes of description designated as lower housing means 3, upper housing means 5, anode means 7, and barrier means 9.

The lower housing means is made up of a plurality of cell housings 11 which are joined in spaced relation by spacers 13 positioned between the corners of adjacent cell housings. Spacers 13 are also positioned between the end-most cell housings and end-guards 15. The spacers provide an air gap 17 between adjacent cell housings and between the end-most cell housings and the end-guards. As shown, the end-guards are provided with apertures 19; however, these are not essential in view of the air gap.

For purposes of illustration each cell housing is shown formed of a U-shaped element 21 having identical mounting plates 23 sealed to the opposite edges thereof. Each mounting plate is provided with a centrally formed window 25. A porous current collecting element, such as a metal screen 27 is sealed to the mounting plates on each side of each cell housing. As shown the current collecting element extends around the outside surface of the U-shaped element. The portion of each current collecting element overlying each window forms a part of a substantially co-extensive gas-depolarized electrode 29.

Terminals for the gas-depolarized electrodes are provided by terminal posts 31 supported by the U-shaped element and electrically united to the current collecting element. Each upstanding arm of the U-shaped element is provided with a centrally located vertical groove 33 to the anode means. Terminal posts 35 are threadedly attached to at least one upstanding arm of each U-shaped element. The inner end of each terminal post 35 extends into a vertical groove for electrical contact with an edge of the anode means. The terminal posts 35 are, of course, mounted above and out of contact with the current collecting elements 27.

As shown the anode means is formed of a gas generating anodically active plate 37 which is enveloped by a contiguous filter 39. To allow the terminal post 35 to contact the active plate through the filter a perforating tip 41 is provided on the inner end of the terminal post.

The upper housing means is formed of a casing element 43. The casing element includes a lower flanged portion 45 having its inside dimensions corresponding to the outside dimensions of the lower housing means. A groove 47 is provided on the inside surface of the flanged portion to receive sealing means 49. The casing element also includes an upstanding cylindrical portion 51 provided with an inwardly extending shoulder 53 at the upper extremity thereof. A plurality of ports 55 are provided in the cylindrical portion. An annular seat 57 is provided on the exterior surface of the cylindrical portion in communication with the ports. A Bunsen-type valve ring 59 is mounted in the annular seat.

An electrode-electrolyte assembly 61 is mounted in the casing element adjacent the inwardly extending shoulder 53. The assembly is formed of an electrolyte means 63, illustrated as an ion exchange membrane, and electrodes 65 and 67. Terminal posts 69 and 71 are connected to electrodes 65 and 67 by electrical conductors 73 and 75, respectively.

For purposes of illustration a gas-permeable, liquid-impermeable barrier means 9 is shown interposed between the upper and lower housing means.

Figure 3:
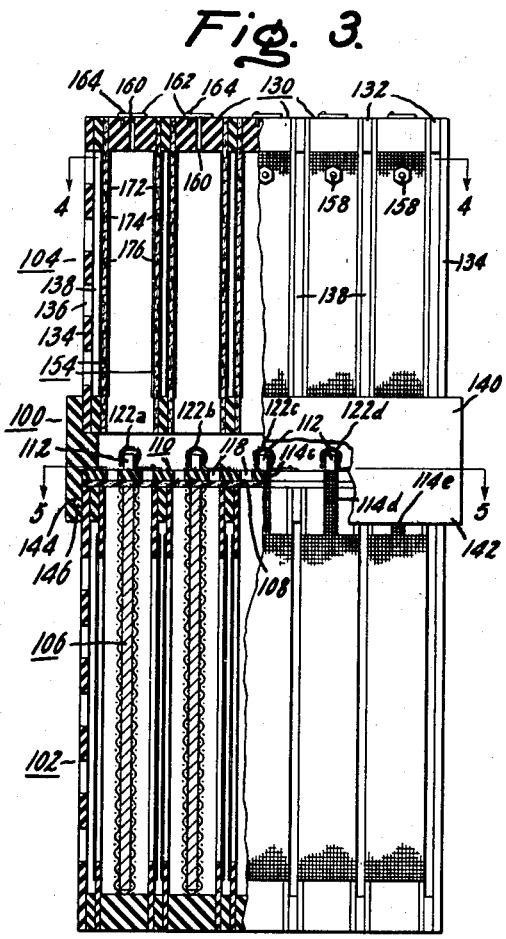
FIGURE 3 is an elevation, partly in section, of a modified unit constructed according to my invention.
Figure 4:
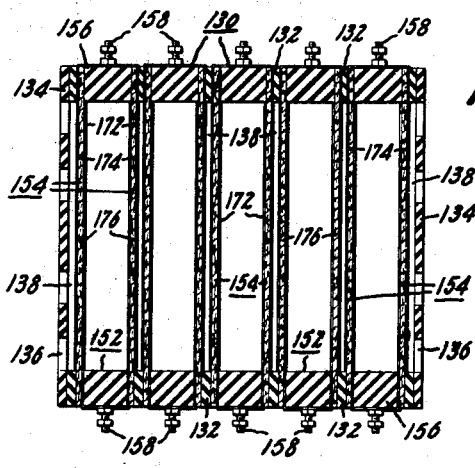
FIGURE 4 is a section taken along line 4—4 in FIGURE 3.
Figure 5:
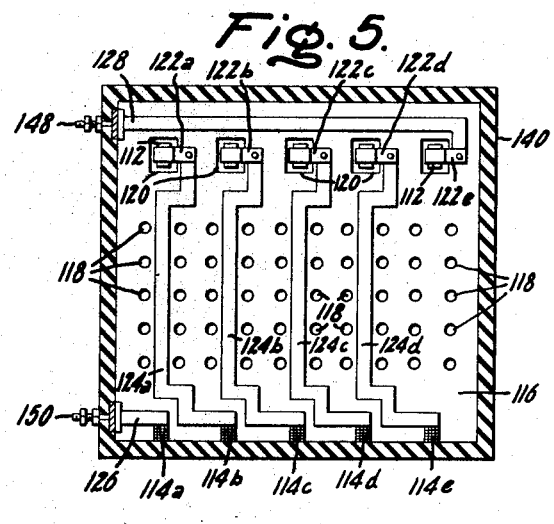
FIGURE 5 is a section taken along line 5—5 in FIGURE 3.

FIGURES 3-5 inclusive illustrate a modified hybrid electrical power unit 100 formed of five major distinct portions, namely a lower housing means 102, an upper housing means 104, anode means 106, barrier means 108, and printed circuit means 110. As shown the barrier means 108 is identical to barrier means 9 previously described. The anode means 106 is similar to the anode means 7, differing by the addition of a tab 112 formed integrally with the plate. The lower housing means 102 is similar to the lower housing means 3, differing by the omission of terminal posts and the addition of terminal strips 114 formed integrally with the current collecting elements.

Overlying the lower housing means and the barrier means is the printed circuit means. As best illustrated in FIGURE 5 this means is comprised of an insulative circuit board 116 having apertures 118 to allow gas passage therethrough. The circuit board is also provided with a plurality of windows 120 to allow mounting of the board at the level of the tabs. A connector clip 122 is attached to the board adjacent each window to provide a releasable electrical connection with the corresponding tab. The individual cells formed by the lower housing means and anode means are connected in series by printed series connectors 124. As shown clip 122a is connected to terminal strip 114b by series connector 124a. In like manner clips 122b, c, and d are connected to terminal strips 114c, d, and e by series connectors 124b, c, and d, respectively. Terminal strip 114a is connected to a printed terminal connector 126 while clip 122e is connected to printed terminal connector 128.

The upper housing means is comprised of a plurality of cell housings 130 separated between adjacent corners by spacers 132. Spacers are also provided between endmost cell housings and end-guards 134. While apertures 136 are shown provided in the end-guards 134, these are unnecessary since the spacers in each instance form air gaps 138 adjacent each face of the cell housings. An adaptor 140 sealingly circumscribes the lower ends of the cell housings and end-guards as well as the lower spacers. A lower flanged portion 142 of the adaptor is sealingly and releasably mounted over the lower housing means. A groove 144 is provided in the interior surface of the lower flanged portion within which a seal 146 is mounted. As shown in FIGURE 5 terminal means 148 and 150 are provided on the adaptor for providing electrical contact with the printed terminal connectors of the printed circuit means.

Each cell housing 130 is formed of an inerted U-shaped element 152. Identical electrode-electrolyte assemblies 154 are mounted adjacent opposite surfaces of the inverted U-shaped element. An electrolyte means 176 forms a portion of each assembly. As shown the electrolyte means is formed of a porous matrix which is capable of holding an electrolyte by capillary action. The interior electrodes 172 of each cell housing are formed with a common current collecting element extending between the electrodes exterior of a vertical prong 156 of the inverted U-shaped element while the exterior electrodes 174 of each cell housing are united by a common current collector extending exterior of the remaining vertical prong. A terminal post 158 is mounted by each vertical prong to provide an electrical connection to either the inner or outer electrodes of the cell housing through the current collecting element associated with the prong. A port 160 is provided through the upper portion of each inverted U-shaped element. A resilient closure 162 is attached to the inverted U-shaped element by a conductor 164.

Figure 6:
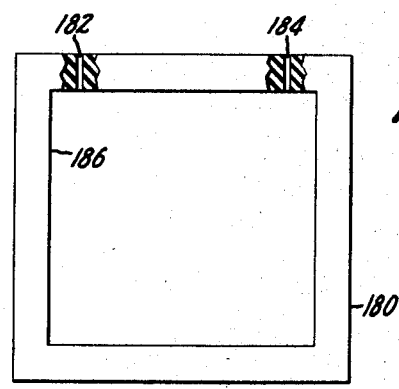
FIGURE 6 is an elevation, partly in section, of an electrolyte frame which may be optionally used in the unit shown in FIGURE 3.

Should it be desired to use a free aqueous electrolyte rather than an electrolyte held in a matrix as shown in the electrode-electrolyte assembly 154, it is only necessary to substitute the electrolyte means 180 shown in FIGURE 6 for the electrolyte means 176. The electrolyte means 180 is formed of an insulative frame having ports 182 and 184 connecting with a central opening 186. The ports may be used to continuously circulate electrolyte or may be used merely to initially deliver electrolyte to each assembly. As is conventional practice the electrodes seal against the frame and cooperate therewith to hold the electrolyte within the assembly.

The electrodes 29, 65, 67, 172, and 174 employed in the hybrid electrical power units illustrated may be fabricated according to techniques well understood in the art. Electrodes capable of reducing any electronegative gas may be used as electrodes 29, 67, and 174. As a practical matter the use of air electrodes is of paramount interest. The term "air electrode" is used in the conventional sense as meaning an electrode which is capable of electrochemically reducing oxygen from ambient air. Such electrodes are, of course, even more efficient in oxygen enriched atmospheres and in pure oxygen. It is further recognized that such electrodes are useful to reduce halogen gases, although there is little practical opportunity for such application. Electrodes 65 and 172 are chosen for their ability to electrochemically oxidize a gas such as hydrogen.

In general it is preferred that the electrodes employ boron carbide, platinum, palladium, or mixtures thereof as an electrocatalyst. Oxygen or air electrodes may employ silver or spinel as an electrocatalyst. With alkali halide, alkaline earth halide, or basic electrolytes nickel and/or silver incorporation may serve to extend the electrocatalyst. Hydrophobic materials, preferably fluorocarbon polymers, may be usefully employed to bond the electrocatalyst particles into a unitary electrode or to unite the electrocatalyst to a current collecting element. Those electrode structures contacting a free aqueous electrolyte are preferably additionally provided with a thin gas-permeable, liquid-impermeable coating of hydrophobic material such as a fluorocarbon polymer. For electrodes contacting a free aqueous electrolyte either a conductive or non-conductive substrate may be employed. Williams et al., Patent No. 3,116,170, illustrates a practically useful electrode structure including a porous organic polymer substrate. Dantowitz in commonly assigned application, Ser. No. 495,055, filed Oct. 12, 1965, discloses similar, but improved, electrode structures. Carbon and metal conductive substrate supported electrodes having utility with either ion exchange resin, immobilized, or free aqueous electrolytes are illustrated by commonly assigned applications, Niedrach, Ser. No. 108,418, filed May 8, 1961, now Patent No. 3,297,484, and Niedrach et. al., Ser. No. 232,689, filed Oct. 24, 1962.

Any conventional type of electrolyte means may be employed in the electrode-electrolyte assemblies. An ion exchange membrane, a matrix for holding electrolyte by capillary action, or a frame for circulating or holding an aqueous electrolyte may be used in either unit 1 or 100 illustrated. It is immaterial whether the electrolyte is acidic or basic.

It is preferred that the gas generating metal anode means be formed of an electropositive metal which liberates hydrogen upon contact with an aqueous electrolyte. For example, both aluminum and magnesium anodes are known to liberate substantial quantities of hydrogen when placed in contact with an alkali halide or alkaline earth halide electrolyte. Other metals having similar gas generating properties could be substituted without departing from the teaching of the invention.

As shown in the drawings the anodes are enveloped by a filter. The filter is an optional feature, but its inclusion may greatly improve the efficiency of the unit in certain applications. For example, it is well known that magnesium anodes form a precipitate upon reaction with an alkali halide or alkaline earth halide electrolyte. When it is desired to replace the anode according to conventional practice, it is necessary to spend a considerable amount of time cleaning out each cell housing. By using a filter to hold the precipitate formed by reaction of the magnesium anode quick and convenient replacement can be achieved. The filter may take the structural form shown in the drawings or may alternately take any form taught by C. E. Kent in commonly assigned application Ser. No. 511,392 filed Dec. 3, 1965. As shown by working examples included in the Kent application highest efficiency filter materials are those having openings of 1 millimeter mean diameter or less (25 mesh or higher) and a free area of at least fifty percent. The filter material should be capable of being wetted by the electrolyte. Any nonconductive material which is substantially inert toward the electrolyte may be employed including nylon, polyethylene, polyurethane, polypropylene, etc.

It is noted that an aqueous electrolyte (not shown in the drawings) must be added to each cell housing of the lower housing means in order to render the units operative. The choice of electrolyte will depend on the anodically active material and gas depolarizer chosen for use. As illustrated by Miller et al., Patent No. 3,043,898, a variety of operative electrolytes are known to the art. It is preferred that alkali halide or alkaline earth halide solutions be employed when magnesium is used as the anodically active material and air or oxygen is used as the gas depolarizer. When aluminum is employed as the anodically active material and air or oxygen is the gas depolarizer, it is preferred to use alkali hydroxide or alkaline earth hydroxide solutions as electrolytes. The aqueous electrolyte is omitted from the drawings, since it is generally preferred to manufacture and sell units constructed according to my invention without including the electrolyte. It is preferred that the aqueous electrolyte be added to the units immediately prior to use to prevent loss of anodically active material through parasitic, gas generating attack by the electrolyte. Alternately, the units could be manufactured and sold without anodes rather than electrolyte to prevent parasitic reaction. As a practical matter, however, it is generally more desirable to omit the aqueous electrolyte for handling and storage ease. Also, both electrolyte and anode means could be omitted prior to actual use.

The barrier means may be formed of any material which is selectively permeable to gas an impermeable to liquid. A thin sheet of an open cell material such as foam rubber is well suited for this purpose. Also, a porous structure formed of a non-wettable or hydrophobic material may be employed. The function of the barrier material is to minimize moisture loss from the lower housing means. It may also be useful in preventing excess moisture accumulation on the interior electrode or the electrode-electrolyte assembly. Where the interior electrode 65 is provided with a wet-proofing film, the barrier means may be omitted entirely. In such instance if electrolyte is depleted from the lower housing, it can be periodically replenished. The use of the barrier means may provide a substantial advantage, however, where water or electrolyte is in short supply or in applications where the unit is required to operate for substantial periods without servicing. Also the barrier means will prevent wetting of the interior electrode by the electrolyte if the unit is accidentally upset.

To illustrate the operation of my invention the unit 1 may be placed in operation by removing the upper housing means 5 from the lower housing means 3 and then lifting the barrier means 9 from atop the lower housing means. A suitable aqueous electrolyte is then poured into each cell housing 11 to a level above the windows 25. If the anode means were formed of magnesium as an anodically active material, for example, the aqueous electrolyte might take the form of saline water. The upper housing means is then repositioned on the lower housing means with the barrier means interposed therebetween.

Electricity may be removed immediately from the cells formed by the cell housings and the anode means 7. This may be accomplished by making electrical connections to terminal posts 31 and 35. It is immaterial whether the cells are connected in series or in parallel or even whether all of the cells are activated. If desired, electricity may be separately taken from the individual cells or any cell grouping, depending on the electrical potential and power output desired.

Whether electricity is taken from the cells formed by the lower housing means and anode means or not, the electrolyte will corrosively attack the magnesium anodes 37 and begin forming hydrogen gas. The hydrogen will pass through the filter 39 and upwardly through the open upper end of each cell housing which thereby serves as a gas exhaust opening. Any electrolyte entrained in the gas will be separated as the hydrogen passes through the barrier means, since this means is chosen to be gas-permeable, liquid-impermeable.

Hydrogen concentration will then build up in the upper housing means. Electricity will be generated by the electrode-electrolyte assembly 61 if an electrical load is connected across terminals 69 and 71. The hydrogen liberated from the lower housing means is then electrochemically oxidized at the interior electrode 65 while oxygen from the air is electrocehmically reduced at the exterior electrode 67. If at any time it is not desired to utilize electricity generated at the upper housing means, hydrogen gas buildup within the upper housing means can be controlled merely by placing a dummy load across the electrode-electrolyte assembly. If this alternative is not chosen, gas may be safely vented from the upper housing means through ports. The pressure at which venting occurs can be controlled by proper choice of Bunsen-type valve ring 59.

When the anodically active material in the anode means has been depleted to the extent that the potential obtainable from the lower housing means cells is unacceptably low, the upper housing means and barrier means are again displaced from the lower housing means. The precipitate formed as a reaction product between the magnesium and electrolyte is contained within each filter and can be easily removed. A fresh anode means can then be slipped into each cell housing. Alternately, each filter can be quickly rinsed free of precipitate and a fresh anode placed therein. The unit is then ready for reassembly and reuse.

If aluminum is employed as an anodically active material instead of magnesium, then it is unnecessary to use the filter since the aluminum reaction product with alkali hydroxide and alkaline earth hydroxide solutions is soluble and can be easily poured out of the cell along with the electrolyte when it is desired to physically recharge the cell. As is readily appreciable the operation of the unit 100 is substantially similar to that of the unit 1 and requires no separate description of operation.

While my invention has been described with reference to certain preferred and exemplary embodiments, it is appreciated that numerous modifications will be readily suggested to those having ordinary skill in the art. For example, the end-guards or the apertures therein may be omitted. The cell housings may be formed as a single element rather than three elements as illustrated. The spacers may also be formed integrally with the cell housings. Alternately, the cells and spacers may be joined for quick disassembly to allow arrangement into units of any desired number of cells. The seal between the upper and lower housing means may be omitted and the sealing properties of the lower flanged portion of the upper housing means relied upon to provide adequate sealing. The valve means for venting gas generated within the unit may be omitted, since the use of a short circuit or dummy load may be used to prevent gas buildup even when no other use for electricity from the electrode-electrolyte assembly is available. The particular terminal arrangements illustrated for drawing power from each cell may be varied according to the electrical requirements of the specific use to which the units are to be placed. For example, every other cell housing of the housing means 104 could be rotated 180 degrees so that a single terminal strip along each edge of the housing means could connect the cells in series. It is not necessary that the electrodes be formed with common current collecting elements. Further, it is not necessary that the cell housings include more than a single air electrode. The barrier means in the unit 100 may take the form of gas-permeable, liquid-impermeable plugs in apertures 118 and windows 120. In view of these and many other detailed modifications which may be made in my preferred embodiments, it is intended that the scope of my invention be determined by reference to the following claims.

What I claim as new and desire to secure by Letters Patent of the United States is:

1. A hybrid electrical power unit comprised of a lower housing means for confining an electrolyte having at least one opening above the electrolyte for removably receiving a gas generating anode means and for exhausting gas, said housing means including a gas-depolarized electrode position for contact with the electrolyte and spaced from the anode means, an upper housing means for confining gas exhausted from said lower housing means removably sealed thereto, gas-permeable, liquid-impermeable barrier means interposed between the lower housing means and the upper housing means, the upper housing means including an electrode-electrolyte assembly formed of first and second spaced electrode means and electrolyte means interposed therebetween, said first electrode means lying adjacent the interior of said upper housing means and the barrier means, and said second electrode means lying adjacent the exterior of said upper housing means.

2. A hybrid electrical power unit according to claim 1 additionally including as an element of the combination the gas generating anode means.

3. A hybrid electrical power unit according to claim 1 additionally including as an element of the combination the electrolyte.

4. A hybrid electrical power unit according to claim 1 additionally incuding as an element of the combination the gas generating anode means, said anode means including magnesium as an anodically active material and including filter means enveloping the portion of the magnesium intended to contact the electrolyte.

5. A hybrid electrical power unit according to claim 1 additionally including as an element of the combination the gas generating anode means, said anode means including aluminum as an anodically active material.

6. A hybrid electrical power unit according to claim 1 in which said electrolyte means is comprised of an ion exchange membrane.

7. A hybrid electrical power unit according to claim 1 in which said electrolyte means is comprised of an electrolyte frame.

8. A hybrid electrical power unit according to claim 1 in which said electrolyte means is comprised of means capable of holding an aqueous electrolyte by capillary attraction.

9. A hybrid electrical power unit comprised of a lower housing means for confining an electrolyte forming a hydrogen exhaust opening above the electrolyte and including an air electrode positioned for contact with the electrolyte, a magnesium anode means removably positioned within said lower housing means for contact with the electrolyte and spaced from said air electrode, said anode means including a magnesium anode and a filter means enveloping the portion of the magnesium anode intended to contact the electrolyte, an upper housing means for confining hydrogen exhausted from said lower housing means removably sealed thereto, hydrogen-permeable, electrolyte-impermeable barrier means interposed between the lower housing means and the upper housing means, the upper housing means including an electrode-electrolyte assembly formed of first and second spaced electrode means and electrolyte means interposed therebetween, said first electrode means lying adjacent the interior of said upper housing means for electrochemically oxidizing hydrogen and said second electrode means lying adjacent the exterior of said upper housing means for electrochemically reducing oxygen from air.

10. A hybrid electrical power unit comprised of a lower housing means for confining an electrolyte forming a hydrogen exhaust opening above the electrolyte and including an air electrode positioned for contact with the electrolyte, an aluminum anode means removably positioned within said lower housing means for contact with the electrolyte and spaced from said air electrode, an upper housing means for confining hydrogen exhausted from said lower housing means removably sealed thereto, hydrogen-permeable, electrolyte-impermeable barrier means interposed between the lower housing means and the upper housing means, the upper housing means including an electrode-electrolyte assembly formed of first and second spaced electrode means and electrolyte means interposed therebetween, said first electrode means lying adjacent the interior of said upper housing means and the barrier means for electrochemically oxidizing hydrogen, and said second electrode means lying adjacent the exterior of said upper housing means for electrochemically reducing oxygen from air.

11. A hybrid electrical power unit comprised of a lower housing means including a plurality of cell housings and means uniting said cell housing in spaced relation, each of said cell housings including as an electrolyte confining wall a gas-depolarized electrode, each of said cell housings opening upwardly for removably receiving a gas generating anode means and for exhaustion gas, an upper housing means for confining gas exhausted from said lower housing means removably sealed thereto, gas-permeable, liquid-impermeable barrier means interposed between the lower housing means and the upper housing means, the upper housing means including as a gas confining wall thereof an electrode-electrolyte assembly formed of first and second spaced electrode means and electrolyte means interposed therebetween, said first electrode means lying adjacent the interior of said upper housing means and the barrier means, and said second electrode means lying adjacent the exterior of said upper housing means.

12. A hybrid electrical power unit according to claim 11 in which said upper housing means is comprised of a plurality of downwardly opening cell housing, each including an electrode-electrolyte assembly as a confining wall thereof and means joining said cell housings in spaced relation.

References Cited

UNITED STATES PATENTS

| | | | |
|---|---|---|---|
| 2,938,064 | 5/1960 | Kordesch | 136—86 |
| 2,925,455 | 2/1960 | Eidensohn et al. | 136—86 |
| 3,370,983 | 2/1968 | Lander et al. | 136—86 |
| 3,375,140 | 3/1968 | Oswin | 136—86 |
| 2,635,431 | 4/1953 | Bichowsky | 62—1 |

WINSTON A. DOUGLAS, Primary Examiner

H. A. FEELEY, Assistant Examiner

U.S. Cl. X.R.

136—86